United States Patent
Teague, III et al.

(10) Patent No.: US 6,770,339 B2
(45) Date of Patent: Aug. 3, 2004

(54) INSULATION PACKAGE

(75) Inventors: Jo M. Teague, III, Littleton, CO (US); John Brooks Smith, Littleton, CO (US); Frank McCampbell, Willows, CA (US)

(73) Assignee: Johns Manville International, Inc., Denver, CO (US)

( * ) Notice: Subject to any disclaimer, the term of this patent is extended or adjusted under 35 U.S.C. 154(b) by 174 days.

(21) Appl. No.: 10/215,242

(22) Filed: Aug. 8, 2002

(65) Prior Publication Data

US 2004/0028847 A1 Feb. 12, 2004

(51) Int. Cl.⁷ .......................... B29D 22/00; B29D 23/00; B32B 1/08
(52) U.S. Cl. .................. 428/35.2; 428/35.7; 428/36.9; 428/36.91; 206/321; 206/83.5; 206/459.5; 206/417; 206/388
(58) Field of Search .............................. 428/34.9, 35.1, 428/35.2, 35.7, 42.1, 42.2, 76, 187, 218, 36.9, 36.91; 206/417, 442, 499, 497, 525.1, 526, 459.5, 407, 321, 83.5, 451

(56) References Cited

U.S. PATENT DOCUMENTS

| | | | | |
|---|---|---|---|---|
| 2,134,636 A | * | 10/1938 | Lewis et al. ................. | 206/756 |
| 2,354,186 A | * | 7/1944 | Donahue ..................... | 206/321 |
| 4,444,311 A | * | 4/1984 | Rias ........................... | 206/391 |
| 6,510,945 B1 | * | 1/2003 | Allwein et al. ............. | 206/388 |

* cited by examiner

Primary Examiner—Harold Pyon
Assistant Examiner—Michael C. Miggins
(74) Attorney, Agent, or Firm—Robert D. Touslee (57) ABSTRACT

A package of fibrous insulation includes a plurality of resilient fibrous insulation blanket layers in a compressed state. The resilient fibrous insulation blanket layers are enveloped within a multi-section covering with different covering sections having at least some information thereon relating to the resilient fibrous insulation layers within the package that is different from the information on another covering section. The covering sections are held in place with respect to each other at least in part by forces exerted on the covering sections by the compressed resilient fibrous insulation blanket layers within the package.

21 Claims, 3 Drawing Sheets

INSULATION PACKAGE

BACKGROUND OF THE INVENTION

The present invention relates to a fibrous insulation package; and in particular, to a fibrous insulation package containing compression wrapped resilient fibrous insulation blanket layers within a multi-section covering. Preferably, the different sections of the multi-section covering contain different information relating to the resilient fibrous insulation blanket products within the package and the different covering sections are held in place with respect to each other, at least in part, by forces exerted on the covering sections by the resilient fibrous insulation blanket products within the package.

For decades resilient fibrous insulation blankets, such as resilient glass fiber insulation blankets in the form of batts or rolls, have been compressed and packaged in unitary polymeric packaging film coverings in a compressed state to: reduce the volume of the product for storage and shipment; to reduce storage and shipping costs; and to make the product, which is light weight but bulky in an uncompressed state, easier to handle. There are a large variety of resilient glass fiber insulation blankets packaged in these unitary polymeric packaging film coverings. For example, the insulation blankets are made in different widths, e.g. nominal 15 inch and 23 inch widths; the insulation blankets may be faced or unfaced; the facings on the faced insulation blankets may be made from of foil-scrim-kraft sheets, kraft sheets or other sheets; the insulation blankets are made with different densities; the insulation blankets are made in different thicknesses; the insulation blankets are made with different thermal properties, e.g. different R-values; and the insulation blankets have different intended applications that require different installation instructions. The unitary polymeric packaging film coverings must have product related information on the coverings that indicates to the consumer or contractor the type of resilient fiber glass insulation blanket contained within a package, e.g. the intended application, faced or unfaced, thermal properties, width, thickness, density, etc. In addition to the information listed above, the unitary polymeric packaging film coverings include other information relating to the insulation blankets, such as the company name and/or logo, warranties, legal notices, addresses, coupons, 800 numbers for customer assistance, etc. With the variations in product information required for the numerous insulation blanket products typically produced and offered for sale by a fibrous insulation manufacturer, such as a glass fiber insulation manufacturer, it is not uncommon for a fibrous insulation manufacturer to require 70 to 80 or more different unitary polymeric packaging film coverings. As a result, in order to have the coverings required for different products readily available, the fibrous insulation manufacturer must dedicate a significant amount of storage space to the different coverings and have a significant investment in covering inventory. In addition, the rolls of covering, which typically weigh several hundred pounds, require time and effort to change when production is changed from one insulation blanket product to another and it would be desirable to reduce the time and/or effort required to make covering changes when insulation blanket product changes are made in a production line. Thus, there has been a long term need for an insulation package that will enable a reduction in the number of full size coverings required to package the numerous insulation blanket products produced and sold by fibrous insulation manufacturers and/or will enable packaging changes without requiring the replacement of one full size covering with another full size covering; that facilitates a relatively quick and easy change from one package to another package when there is a product change on a production line; and that is cost effective.

SUMMARY OF THE INVENTION

The fibrous insulation package of the present invention provides a solution to the problems outlined above, by providing a cost effective package that enables a reduction in the number of different full size coverings required to package the numerous insulation blanket products produced and sold by fibrous insulation manufactures; that enables packaging changes for different insulation blanket products without requiring the replacement of one full size covering with another full size covering; and that facilitates a relatively quick and easy change from one package to another package when there is a product change on a production line. The fibrous insulation package of the present invention includes a plurality of resilient fibrous insulation blanket layers in a compressed state. The resilient fibrous insulation blanket layers are enveloped within a multi-section covering with different sections of the covering having at least some information thereon relating to the resilient fibrous insulation layers within the package that is different from the information on another section of the covering. The covering sections are held in place with respect to each other at least in part by forces exerted on the covering sections by the resilient fibrous insulation blanket layers within the package.

In one embodiment of the fibrous insulation package of the present invention, the multi-section covering includes a clear outer tubular polymeric film section, formed by wrapping and sealing a sheet of clear polymeric film about the insulation being packaged while the insulation is compressed, and one or more inner banner sections. Typically, the clear outer polymeric packaging film section has information thereon generic to a plurality of different resilient fibrous insulation blanket products in a product line and a plurality of compressed resilient fibrous insulation blanket layers, e.g. glass fiber blanket layers, of the product line are enveloped within the clear outer polymeric packaging film section. One or more of the separate inner banner sections are located intermediate (between) the clear polymeric packaging film section and the plurality of compressed resilient fibrous insulation blanket layers enveloped within the clear polymeric packaging film section. Typically, the inner banner section(s) have information thereon, specific to the plurality of resilient fibrous insulation blanket layers enveloped within the clear polymeric packaging film section. The information on the inner banner section(s) is readable through the clear polymeric packaging film section and the inner banner section(s) of the package are held in place by forces exerted on the clear outer polymeric packaging film section and the inner banner section(s) by the resilient fibrous insulation blanket layers contained within the package. Thus, with this package, to reduce the number of full size coverings needed for a product line, a full size covering section can be used with generic information relating to a number of products within the product line and one or more banner sections with product specific information directed to the insulation blankets within the package can be inserted between and held in place between the full size covering section and the insulation within the package.

In another embodiment of the fibrous insulation package of the present invention, the compressed resilient fibrous insulation blanket layers, e.g. glass fiber blanket layers, are enveloped within a packaging covering that includes two or more covering sections with each covering section having information thereon relating to the resilient fibrous insulation blanket layers within the covering and with at least some of the information on one of the covering sections being different from the information printed on another of the covering sections. The tubular covering sections of the package are each formed by wrapping and sealing a sheet about the insulation being packaged while the insulation is compressed and overlay different portions of the resilient fibrous insulation blanket layers. Preferably, adjacent covering sections have overlapping edge portions that are sealed together, by forces exerted by the resilient fibrous insulation blanket layers on the covering sections, to at least retard the passage of dirt and water into the package where the dirt and water could cause damage to the product within the package. With this package, since each covering section forms only part of the covering and since each covering section can have different product related information thereon, different covering sections can be substituted for each other to form a multi-section package covering with both generic and specific product information thereon relating to any of the products in the product line and there is no need to substitute one full size covering for another full size covering when changing products on a production line.

DESCRIPTION OF THE PREFERRED EMBODIMENT

The multi-section fibrous insulation package of the present invention contains a plurality of resilient fibrous insulation blanket layers or batts 20, e.g. typically from about seven to about sixteen layers or batts, in a compressed state with the layers or batts typically having a thickness from about ⅕ to about ⅛ or less of their uncompressed thickness. While the package may be used to package other resilient fibrous insulation blanket products, such as but not limited to resilient mineral wool or polymeric fiber insulation products, the multi-section fibrous insulation package of the present invention is especially well suited for packaging faced or unfaced resilient glass fiber thermal and acoustical insulation blanket layers or batts that are from about 15 inches to about 24 inches in width and that may be in the form of individual batts about 48 inches in length; individual batts about 93 inches in length that are folded in half to form layers about 48 inches in length for packaging; or continuous lengths of about 25 feet or more that are wound in a spiral for packaging. Typically, in an uncompressed state, the resilient glass fiber insulation blanket layers 20 are about 1, 3½, 5½, 6½, 8¼, 10¼, or 13 inches in thickness; have densities between about 0.4 and about 1.5 pounds per cubic foot; and have a R-Values from about R-11 to about R-38.

Figure 1:
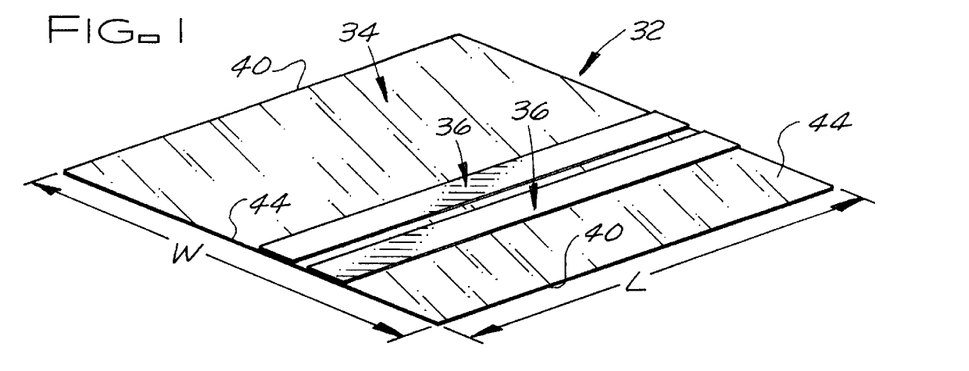
FIG. 1 is a perspective view of a first multi-section covering of the present invention.
Figure 2:
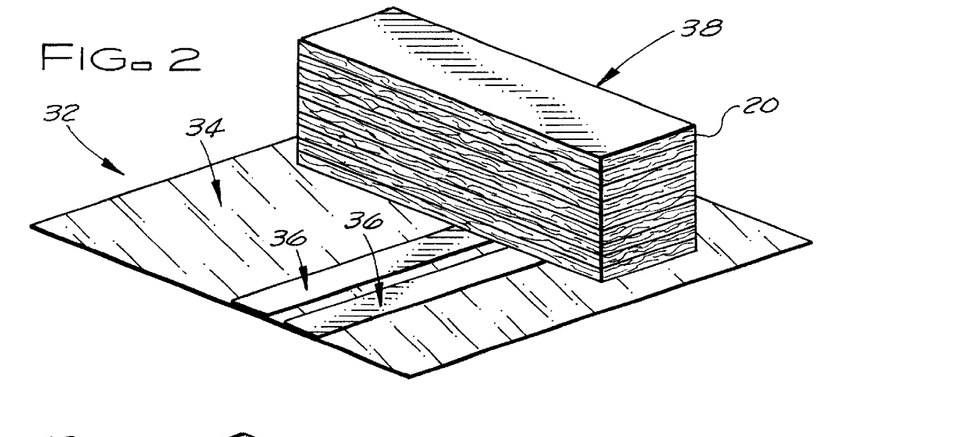
FIG. 2 is a perspective view of the multi-section covering of FIG. 1 with a plurality of resilient fibrous insulation batts thereon (shown in a compressed state for illustrative purposes) prior to enveloping the batts within the covering.
Figure 3:
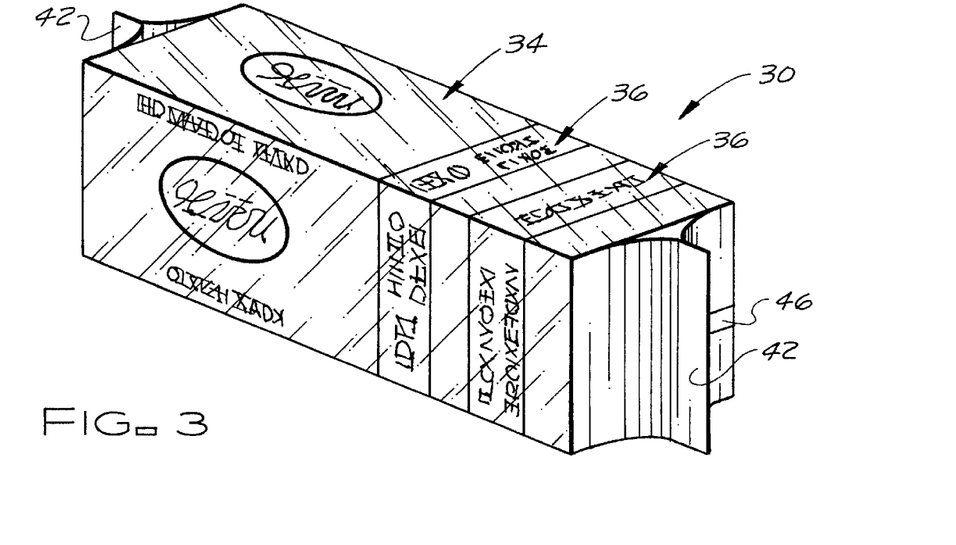
FIG. 3 is a perspective view of a first insulation package of the present invention that has been formed from the multi-section covering of FIG. 1.

FIGS. 1–3 show a first embodiment 30 of the fibrous insulation package of the present invention. As shown in FIG. 1, the multi-section covering 32 of the insulation package 30 includes a clear outer polymeric film section 34 and one or more inner banner sections 36 that may be made of polymeric film, paper, etc. For packaging a stack 38 of compressed resilient fibrous insulation layers 20 that are about 48 inches in length, the clear outer polymeric film section 34 is typically about 70 inches in width "W". This permits the edge portions 40 of the clear outer polymeric film section 34 to be heat sealed, adhesively bonded or otherwise bonded together into tabs 42, such as shown in FIG. 3, after the film section 34 has been wrapped about the stack 38 of compressed resilient fibrous insulation blanket layers, to close the ends of the multi-section covering 32 of the fibrous insulation package 30 about the stack 38 of compressed resilient fibrous insulation blanket layers. The clear outer polymeric film section 34, which is typically cut from a longer length of polymeric film in roll form, has a length "L" equal to the length required to wrap the clear outer polymeric film section 34 about the stack 38 of compressed resilient fibrous insulation blanket layers 20 and heat seal, adhesively bond or otherwise bond the edge portions 44 of the film section 34 together along their lengths in a stress riser 46, such as the stress riser shown in FIG. 3, to form a tubular package about the stack 38 of compressed resilient fibrous insulation blanket layers 20 that retains the stack of resilient fibrous insulation blanket layers in a compressed state.

The inner banner section or sections 36 may be of various widths and lengths required to contain the desired product information relating to the stack 38 of compressed resilient fibrous insulation blanket layers 20 within the fibrous insulation package 30. Examples of the type of information that may be included on the inner banner section(s) 36 to be visible through the clear outer polymeric film section 34 are: promotional information; R-Values; batt sizes including, width, length and thickness; whether the resilient fibrous insulation blanket layers are faced or unfaced and, if faced, what type of facing; installation instructions; warranties and other legal notices; and other product information specific to the geographical area where the product is to be sold. Typically, the inner banner section(s) 36 will be made of polymeric film, be about the same length as the length of the clear outer polymeric film section 34, and have ends sealed or bonded in the stress riser 46. The widths of the inner banner section(s) 36 may vary with the type and amount of information required, particularly, the amount of information required that is specific to the product within the fibrous insulation package 30. For example, the banner section(s) 36 typically may be from about an inch wide to two feet wide.

Preferably, the clear outer polymeric film section 34 is made from a packaging film (e.g. a polyethylene packaging film between about 0.0005 and about 0.0050 inches in thickness and typically about 0.0025 inches in thickness) that is easily printed upon, is colorless, and may be heat sealed to form the tabs 42 and the stress riser 46. However, the clear outer polymeric film section 34 may be colored provided the film section 34 is sufficiently clear or translucent to permit information printed or otherwise formed on the inner banner section(s) 36 to be easily read or viewed through the clear outer polymeric film section 34. Preferably, the inner banner section(s) 36 are made of a polymeric film, such as a polyethylene film, paper or other sheet material that can be easily printed upon and bonded or heat sealed to the stress riser 46.

As shown in FIG. 3, in the finished fibrous insulation package 30, the banner section or sections 36 are located intermediate or confined between the inner surface of the clear outer polymeric film section 34 and the stack 38 of compressed resilient fibrous insulation blanket layers 20. In the fibrous insulation package 30, the forces exerted by the stack 38 of compressed resilient fibrous insulation blanket layers 20 against the clear outer polymeric film section 34 and the inner banner section(s) 36 causes the inner banner section(s) to be gripped between the clear outer polymeric film section 34 and the stack 38 of compressed resilient fibrous insulation blanket layers and held in place so that the banner section(s) 36 can not move relative to the clear outer polymeric film section 34. It is important to hold the banner section(s) 36 securely in place beneath the clear outer polymeric film section 34. Typically, the clear outer polymeric film section 34 will have information printed or otherwise placed thereon, generic to a number of different resilient fibrous insulation blanket products, such as a company logo, trademark, etc, while the inner banner section(s) 36 will have information printed or otherwise placed thereon more specific to the resilient fibrous insulation blanket products within a particular package. Thus, once the banner section(s) 36 are located within the package beneath the clear outer polymeric film section 34 so that information on the clear outer polymeric film section 34 does not overlie the information on the banner section(s) 36, the banner section (s) 36 must be retained in place so that information on the banner section(s) 36 is not masked by information on the clear outer polymeric film section 34 due to movement of the banner section(s) relative to the clear outer polymeric film section 34. By way of example, in FIG. 3, the clear outer polymeric film section 34 includes the company name, the company logo and a trademark generic to a product line. A first inner banner section 36 includes information specific to the product within the package 30, i.e. the R-Value and the type of facing on the product. A second banner section 36 includes information specific to the product within the package 30, i.e. installation instructions, and also includes information that may or may not be specific to the product within the package, i.e. promotional information.

Figure 4:
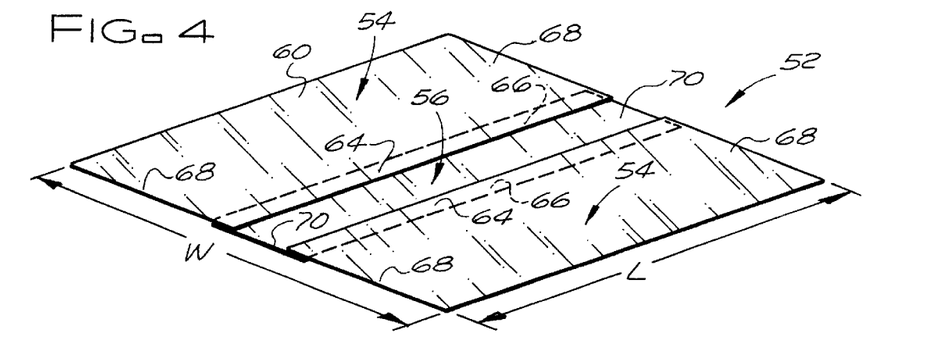
FIG. 4 is a perspective view of a second multi-section covering of the present invention.
Figure 5:
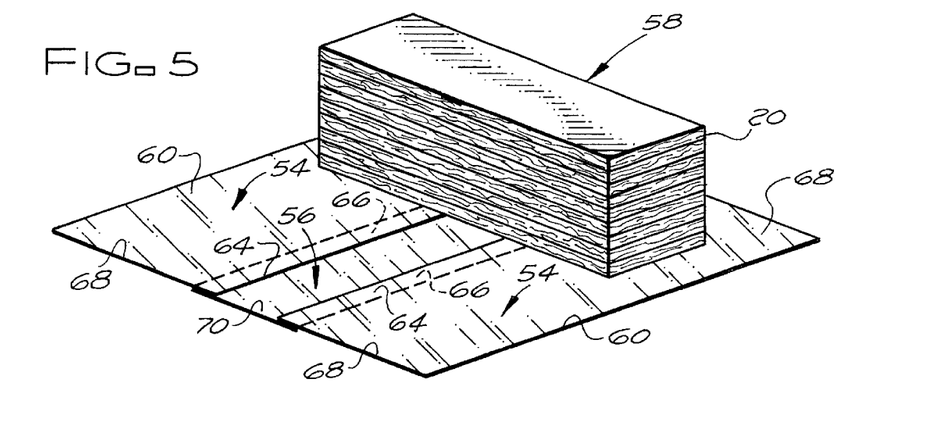
FIG. 5 is a perspective view of the multi-section covering of FIG. 4 with a plurality of resilient fibrous insulation batts thereon (shown in a compressed state for illustrative purposes) prior to enveloping the batts within the covering.
Figure 6:
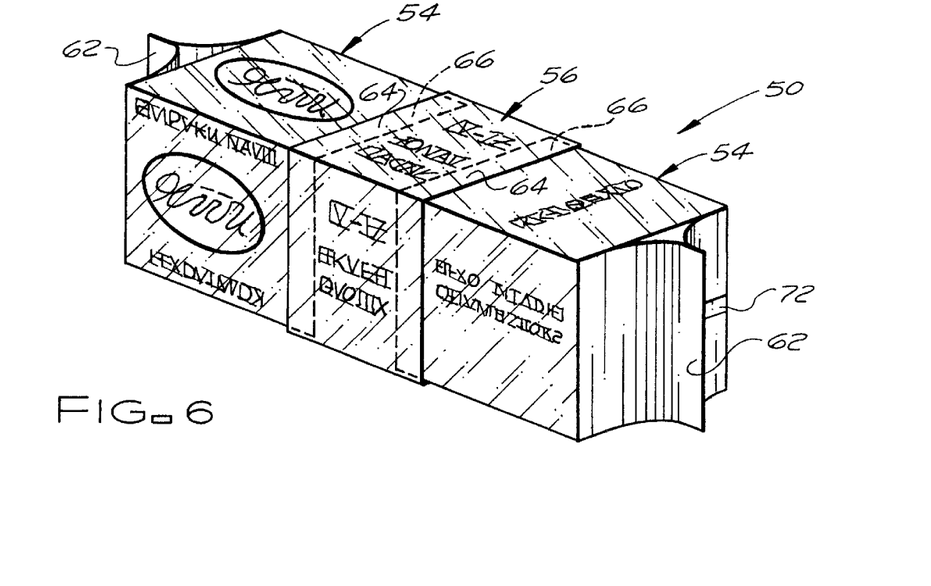
FIG. 6 is a perspective view of a first insulation package of the present invention that has been formed from the multi-section covering of FIG. 4.

FIGS. 4–6 show a second embodiment 50 of the fibrous insulation package of the present invention. As shown in FIG. 4, the multi-section covering 52 of the insulation package 50 includes three separate covering sections (two end sections 54 and a middle section 56). For packaging a stack 58 of compressed resilient fibrous insulation layers 20 that are about 48 inches in length, the two end covering sections 54 and the middle covering section 56 form a multi-section covering that is typically about 70 inches in width "W". This permits the lateral edge portions 60 of the end covering sections 54 to be heat sealed, adhesively bonded or otherwise bonded together into tabs 62, such as shown in FIG. 6, after the end covering sections 54 have been wrapped about the stack 58 of compressed resilient fibrous insulation blanket layers, to close the ends of the multi-section covering 52 of the fibrous insulation package 50 about the stack 58 of compressed resilient fibrous insulation blanket layers. The relative widths of the end covering sections 54 and the middle covering section 56 may vary, e.g. depending on the information to be provided on the different sections and, as shown in FIGS. 4–6, preferably, the lateral edge portions 64 of the end covering sections 54 and the lateral edge portions 66 of the middle covering section 56 overlap.

The end covering sections 54 and the middle covering section 56 are typically cut from a longer sheet in roll form. The end covering sections 54 and the middle covering section 56 have a length "L" equal to the length required to wrap the covering sections 54 and 56 about the stack 58 of compressed resilient fibrous insulation blanket layers 20 and heat seal, adhesively bond or otherwise bond the end edge portions 68 of the end covering sections 54 and the end edge portions 70 of the middle covering section 56 together along their lengths in a stress riser 72, such as the stress riser shown in FIG. 6, to form a tubular package about the stack 58 of compressed resilient fibrous insulation blanket layers 20. The tubular package formed retains the stack of resilient fibrous insulation blanket layers in a compressed state.

Preferably, the end covering sections 54 and the middle covering section 56 of the multi-section covering 52 are made from a packaging film (e.g. a polyethylene packaging film between about 0.0005 and about 0.0050 inches and typically about 0.0025 inches in thickness) that is easily printed upon and that may be heat sealed to form the tabs 62 and the stress riser 72. If a banner section or sections (such as banner sections 36 of FIG. 1, not shown in FIGS. 4–6) were to be included in the package 50 intermediate one or more of the covering sections 54 or 56 and the stack 58 of resilient fibrous insulation blanket layers 20 within the package 50, the packaging film for that section or sections should be sufficiently clear or translucent to permit information printed or otherwise formed on the inner banner section(s) to be easily read or viewed through the outer film section. While it is preferred to form the covering sections 54 and 56 from polymeric films, it is contemplated that for certain applications, the covering sections may be made of kraft paper or other sheet materials that can be easily printed upon and bonded or heat sealed to form the tabs 62 and the stress riser 72.

In the finished fibrous insulation package 50 shown in FIG. 6, the edge portions 64 of the end covering sections 54 are located intermediate or confined between the inner surfaces of the edge portions 66 of the middle covering section 56 and the stack 58 of compressed resilient fibrous insulation blanket layers 20. In the fibrous insulation package 50, the forces exerted by the stack 58 of compressed resilient fibrous insulation blanket layers 20, against the edge portions 64 of the end covering sections 54 and the edge portions 66 of the middle covering section 56, causes the inner edge portions 64 of the end covering sections 54 to be gripped between the edge portions 66 of the middle covering section 56 and the stack 58 of compressed resilient fibrous insulation blanket layers and held in place so that there is little or no relative movement of the covering sections 54 and 56 relative to each other and a seal is formed between the covering sections to at least retard the ingress of dirt and water into the package 50. While it is preferred to form the finished fibrous insulation package 50, as shown in FIG. 6, as an alternative, the edge portions 66 of the middle covering section 56 can be located intermediate or confined between the inner surfaces of the edge portions 64 of the end covering sections 54 and the stack 58 of compressed resilient fibrous insulation blanket layers 20. In this embodiment of the fibrous insulation package 50, the forces exerted by the stack 58 of compressed resilient fibrous insulation blanket layers 20, against the edge portions 64 of the end covering sections 54 and the edge portions 66 of the middle covering section 56, causes the inner edge portions 66 of the middle covering section 56 to be gripped between the edge portions 64 of the end covering sections 54 and the stack 58 of compressed resilient fibrous insulation blanket layers and held in place so that there is little or no relative movement of the covering sections 54 and 56 relative to each other and a seal is formed between the covering sections to at least retard the ingress of dirt and water into the package 50.

While the edge portions 64 and 66 of the end covering sections 54 and the middle covering section 56 can be heat-sealed, adhesively bonded, or otherwise bonded together along their lengths, this would require another manufacturing step and it is preferred to hold the edge portions 64 and 66 of the end covering sections 54 and the middle covering section 56 together in sealing engagement, along the lengths of the edge portions, solely by the forces exerted on the covering sections by the stack 58 of compressed resilient fibrous insulation blanket layers 20 within the package 50 and to have the covering sections bonded together only at the stress riser 72. The amount of overlap between the covering sections may vary provided that the overlap is sufficient to provide a good seal between the covering sections 54 and 56. However, it is contemplated that the overlap would typically be about one half of an inch to about two inches in width.

With the multi-section covering 52 of the package 50, since each covering section forms only part of the covering and since each covering section may have different product related information thereon, different covering sections can be substituted for each other to form a customized multi-section package covering with both generic and product specific information thereon relating to the products within the package 50. By way of example, in FIG. 6, one of the end covering sections 54 includes the company name, the company logo and a trademark generic to a product line and the other end covering section includes information specific to the product within the package 30, i.e. installation instructions, and also includes information that may or may not be specific to the product within the package, i.e. promotional information. As shown, the middle covering section 56 includes information specific to the product within the package 50, i.e. the R-Value and the type of facing on the product. Of course the information included on each section can be selected to best suit the application. For example, the information shown in FIG. 6 on the middle covering section 56 could be located on one of the end covering sections.

Figure 7:
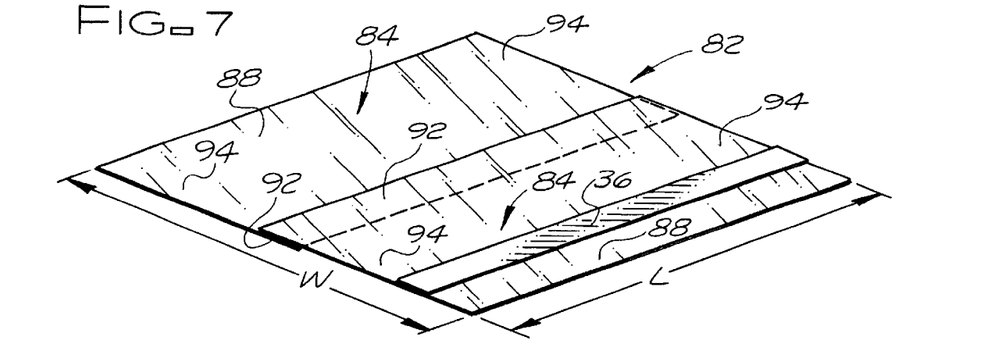
FIG. 7 is a perspective view of a third multi-section covering of the present invention.
Figure 8:
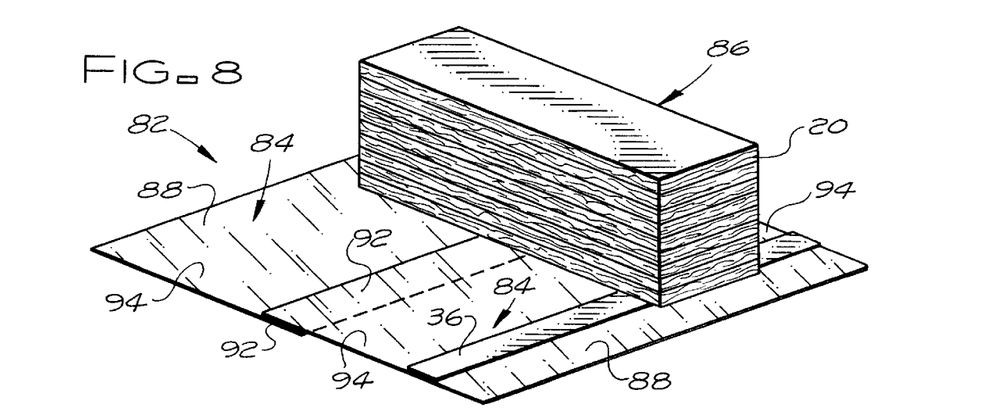
FIG. 8 is a perspective view of the multi-section covering of FIG. 7 with a plurality of resilient fibrous insulation batts thereon (shown in a compressed state for illustrative purposes) prior to enveloping the batts within the covering.
Figure 9:
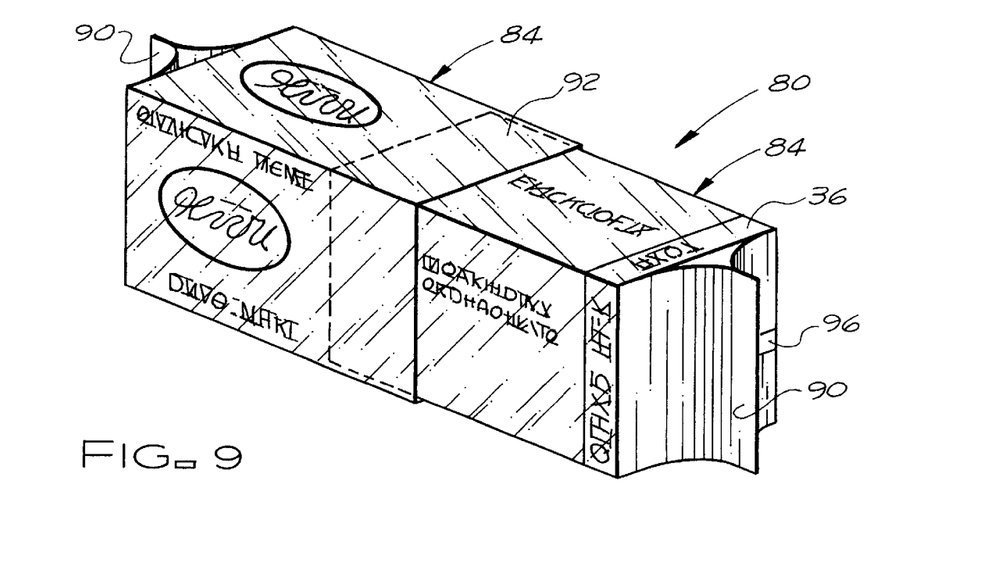
FIG. 9 is a perspective view of a first insulation package of the present invention that has been formed from the multi-section covering of FIG. 7.

FIGS. 7–9 show a third embodiment 80 of the fibrous insulation package of the present invention. As shown in FIG. 7, the multi-section covering 82 of the insulation package 80 includes two separate covering sections 84. For packaging a stack 86 of compressed resilient fibrous insulation layers 20 that are about 48 inches in length, the two covering sections 84 form a multi-section covering that is typically about 70 inches in width "W". This permits the lateral edge portions 88 of the covering sections 84 to be heat sealed, adhesively bonded, or otherwise bonded together into tabs 90, such as the tabs shown in FIG. 9, after the covering sections 84 have been wrapped about the stack 86 of compressed resilient fibrous insulation blanket layers, to close the ends of the multi-section covering 82 of the fibrous insulation package 80 about the stack 86 of compressed resilient fibrous insulation blanket layers. The relative widths of the covering sections 84 may vary, e.g. depending on the information to be provided on the different sections and, preferably, as shown in FIGS. 7–9, the lateral edge portions 92 of the covering sections 84 overlap.

The covering sections 84, which are typically cut from a longer sheet in roll form. The covering sections have a length "L" equal to the length required to wrap the covering sections 84 about the stack 86 of compressed resilient fibrous insulation blanket layers 20 and heat seal, adhesively bond, or otherwise bond the end edge portions 94 of the covering sections 84 together along their lengths in a stress riser 96, such as the stress riser shown in FIG. 9, to form a tubular package about the stack 86 of compressed resilient fibrous insulation blanket layers 20 that retains the stack of resilient fibrous insulation blanket layers in a compressed state.

Preferably, the covering sections 84 of the multi-section covering 82 are made from a packaging film (e.g. a polyethylene packaging film between about 0.0005 and about 0.0050 inches and typically about 0.0025 inches in thickness) that is easily printed upon and that may be heat sealed to form the tabs 90 and the stress riser 96. If a banner section or sections (such as banner sections 36 of FIG. 1) are included in the package 80 intermediate one or more of the covering sections 84 and the stack 86 of resilient fibrous insulation blanket layers 20 within the package 80, the packaging film for that section or sections should be sufficiently clear or translucent to permit information printed or otherwise formed on the inner banner section(s) to be easily read or viewed through the outer film section. While it is preferred to form the covering sections 84 from polymeric films, it is contemplated that for certain applications, the covering sections may be made of kraft paper or other sheet materials that can be easily printed upon and bonded or heat sealed to form the tabs 90 and the stress riser 96.

In the finished fibrous insulation package 80 shown in FIG. 9, the lateral edge portion 92 of one of the covering sections 84 is located intermediate or confined between the inner surface of the edge portion 92 of the other covering section 84 and the stack 86 of compressed resilient fibrous insulation blanket layers 20. In the fibrous insulation package 80, the forces exerted by the stack 86 of compressed resilient fibrous insulation blanket layers 20, against the edge portions 92 of the covering sections 84, causes the inner edge portion 92 of one of the covering sections 84 to be gripped between the outer edge portion 92 of the other covering section 84 and the stack 86 of compressed resilient fibrous insulation blanket layers and to be held in place so that there is little or no relative movement of the covering sections 84 relative to each other and a seal is formed between the covering sections to at least retard the ingress of dirt and water into the package 80. While the edge portions 92 of the covering sections 84 can be heat-sealed, adhesively bonded, or otherwise bonded together along their lengths, this would require another manufacturing step and it is preferred to hold the edge portions 92 of the covering sections 84 together in sealing engagement, along the lengths of the edge portions, solely by the forces exerted on the covering sections by the stack 86 of compressed resilient fibrous insulation blanket layers 20 within the package 80 and to have the covering sections bonded together only at the stress riser 96. The relative widths of the covering sections 84 and the amount of overlap between the covering sections 84 may vary provided that the overlap is sufficient to provide a good seal between the covering sections 84. However, it is contemplated that the overlap would typically be about one half inch to about two inches. The banner section 36 shown in FIGS. 7–9, is confined between the outer covering section and the stack 86 of compressed resilient fibrous insulation blanket layers 20 in the same manner the banner sections 36 are held in place in the embodiment of FIGS. 1–3.

With the multi-section covering 82 of the package 80, since the two outer covering sections each form only part of the covering and since each covering section may have different product related information thereon, different covering sections can be substituted for each other to form a customized multi-section package covering with both generic and product specific information thereon relating to the products within the package 80. In addition, one or more banner sections 36 may be placed intermediate one or both of the outer covering sections 84 and the stack 86 of compressed resilient fibrous insulation blanket layers 20. By way of example, in FIG. 9, one of the outer covering sections 84 includes the company name, the company logo and a trademark generic to a product line and the other outer covering section 84 includes information specific to the product within the package 80, i.e. installation instructions, and also includes information that may or may not be specific to the product within the package, i.e. promotional information. The banner section 36 includes information specific to the product within the package 80, i.e. the R-Value and the type of facing on the product.

In describing the invention, certain embodiments have been used to illustrate the invention and the practices thereof. However, the invention is not limited to these specific embodiments as other embodiments and modifications within the spirit of the spirit of the invention will readily occur to those skilled in the art on reading this specification. Thus, the invention is not intended to be limited to the specific embodiments disclosed, but is to be limited only by the claims appended hereto.

What is claimed is:

1. A package of resilient fibrous insulation, comprising:
    a plurality of resilient fibrous insulation blanket layers; the resilient fibrous insulation blanket layers having a length, a width and a thickness; the resilient fibrous insulation blanket layers being in a compressed state;
    the resilient fibrous insulation blanket layers being encapsulated within a multi-section tubular covering that is closed at each end; the multi-section tubular covering comprising a plurality of separate overlapping sections with each section having information thereon relating to the plurality of resilient fibrous insulation blanket layers within the multi-section tubular covering and with at least some of the information on one of the sections being different from the information on another of the sections; and forces exerted on the sections of the multi-section tubular covering by the plurality of compressed resilient fibrous insulation blanket layers encapsulated within the multi-section tubular covering to maintain the separate overlapping sections of the multi-section tubular covering in place relative to each other.

2. The package of resilient fibrous insulation according to claim 1, wherein:
    the multi-section tubular covering comprises a first outer section of clear polymeric film that is tubular and closed at each end and a second inner banner section; the second inner banner section is located intermediate the first outer section of clear polymeric film and the plurality of compressed resilient fibrous insulation blanket layers enveloped encapsulated within the multi-section tubular covering and held in place against an inner surface of the first outer section of clear polymeric film by forces exerted on the first outer section of clear polymeric film and the second inner banner section by the compressed resilient fibrous insulation blanket layers enveloped within the multi-section tubular covering; the second inner banner section having information thereon relating to the plurality of compressed resilient fibrous insulation blanket layers encapsulated within the multi-section tubular covering; and the information on the second inner banner section being readable through the first outer section of clear polymeric film.

3. The package of resilient fibrous insulation according to claim 1, wherein:
    the multi-section tubular covering comprises first and second polymeric film sections with each polymeric film section having information thereon relating to the compressed resilient fibrous insulation blanket layers within the multi-section tubular covering and with at least some of the information on the first polymeric film section being different from the information on the second polymeric film section; and
    the first polymeric film section being tubular and overlaying a first portion of the plurality of compressed resilient fibrous insulation blanket layers encapsulated within the multi-section tubular covering; the second polymeric film section being tubular and overlaying a second portion of the compressed resilient fibrous insulation blanket layers encapsulated within the multi-section tubular covering; and the first and the second polymeric film sections having overlapping edge portions which are sealed together, at least in part, by forces exerted by the compressed resilient fibrous insulation blanket layers on the first and second polymeric film sections, to retard the passage of dirt and water into the package.

4. The package of resilient fibrous insulation according to claim 3, wherein:
    the overlapping edge portions of the first and second polymeric film sections are heat sealed together to prevent the entry into the package of dirt and water at the overlapping edge portions.

5. The package of resilient fibrous insulation according to claim 1, wherein:
    the multi-section tubular covering comprises first, second and third polymeric film sections with each polymeric film section having information thereon relating to the compressed resilient fibrous insulation blanket layers within the multi-section tubular covering and with at least some of the information on one of the polymeric film sections being different from the information on one of the other polymeric film sections; and
    the first polymeric film section having a tubular configuration and being closed at an outer end to encapsulate a first end portion of the plurality of compressed resilient fibrous insulation blanket layers encapsulated within the multi-section tubular covering; the second polymeric film section having a tubular configuration and being open at both ends to encapsulate a middle portion of the plurality of compressed resilient fibrous insulation blanket layers encapsulated within the multi-section tubular covering; the third polymeric film section having a tubular configuration and being closed at an outer end to encapsulate a second end portion of the plurality of compressed resilient fibrous insulation blanket layers encapsulated within the multi-section tubular covering; the first and the second polymeric film sections having overlapping edge portions which are sealed together, at least in part, by forces exerted by the compressed resilient fibrous insulation blanket layers enveloped within the multi-section tubular covering on the first and second polymeric film sections, to retard the passage of dirt and water into the package; and the third and the second polymeric film sections having overlapping edge portions which are sealed together, at least in part, by forces exerted by the compressed resilient fibrous insulation blanket layers encapsulated within the multi-section tubular covering on the third and second polymeric film sections, to at least retard the passage of dirt and water into the package.

6. The package of resilient fibrous insulation according to claim 5, wherein:
the overlapping edge portions of the first and second polymeric film sections and the overlapping edge portions of the second and third film sections are heat sealed together to prevent the entry into the package of dirt and water at the overlapping edge portions.

7. A package of resilient glass fiber insulation, comprising:
a plurality of resilient glass fiber insulation blanket layers; the resilient glass fiber insulation blanket layers having a length, a width and a thickness; the resilient glass fiber insulation blanket layers having an uncompressed density between about 0.4 and 1.5 pounds/ft$^3$ and an uncompressed thickness of at least one inch; the resilient glass fiber insulation blanket layers being in a compressed state;
the resilient glass fiber insulation blanket layers being encapsulated within a multi-section tubular covering; the multi-section tubular covering comprising a clear outer polymeric film section and an inner banner section; the clear outer polymeric film section having information thereon relating to the compressed resilient glass fiber insulation blanket layers encapsulated within the multi-section tubular covering; and the inner banner section being located intermediate the clear outer polymeric film section and the plurality of compressed resilient glass fiber insulation blanket layers encapsulated within the multi-section tubular covering and being held in place against an inner surface of the clear outer polymeric film section by forces exerted on the clear outer polymeric film section and the inner banner section by the compressed resilient fibrous insulation blanket layers encapsulated within the multi-section tubular covering; the inner banner section having information thereon relating to the compressed resilient glass fiber insulation layers encapsulated within the multi-section tubular covering that differs from the information on the clear outer polymeric film section; and the information on the inner banner section being readable through the clear outer polymeric film section.

8. The package of resilient glass fiber insulation according to claim 7, wherein:
the plurality of compressed resilient glass fiber insulation blanket layers is formed by a plurality of resilient glass fiber insulation batts.

9. The package of resilient glass fiber insulation according to claim 7, wherein:
the clear outer polymeric film section is a tubular film section that encapsulated the plurality of compressed resilient glass fiber insulation blanket layers and that is sealed at first and second ends of the package.

10. A package of resilient glass fiber insulation, comprising:
a plurality of resilient glass fiber insulation blanket layers; the resilient glass fiber insulation blanket layers having a length, a width and a thickness; the resilient glass fiber insulation blanket layers having an uncompressed density between about 0.4 and 1.5 pounds/ft$^3$ and an uncompressed thickness of at least one inch; the resilient glass fiber insulation blanket layers being in a compressed state;
the resilient glass fiber insulation blanket layers being encapsulated within a multi-section tubular covering; the multi-section tubular comprising first and second separate overlapping polymeric film sections with each polymeric film section having information thereon relating to the compressed resilient glass fiber insulation blanket layers within the multi-section tubular covering and with at least some of the information on the first polymeric film section being different from the information on the second polymeric film section; and
the first polymeric film section being tubular, overlaying a first portion of the plurality of compressed resilient glass fiber insulation blanket layers encapsulated within the multi-section tubular covering, and being closed at an outer end to encapsulate a first end portion of the plurality of compressed resilient glass fiber insulation blanket layers encapsulated within the multi-section tubular covering; the second polymeric film section being tubular, overlaying a second portion of the compressed resilient glass fiber insulation blanket layers enveloped within the multi-section tubular covering, and being closed at an outer end to encapsulate a second end portion of the plurality of compressed resilient glass fiber insulation blanket layers encapsulated within the multi-section tubular covering; and the first and the second polymeric film sections having overlapping edge portions which are sealed together, by forces exerted by the resilient glass fiber insulation blanket layers encapsulated within the multi-section tubular covering on the first and second separate overlapping polymeric film sections, to retard the passage of dirt and water into the package.

11. The package of glass fiber insulation according to claim 10, wherein:
the plurality of compressed resilient glass fiber insulation layers is a plurality of resilient glass fiber insulation batts.

12. The package of glass fiber insulation according to claim 10, wherein:
the overlapping edge portions of the first and second polymeric film sections are not bonded together.

13. The package of resilient fibrous insulation according to claim 10, wherein:
the overlapping edge portions of the first and second polymeric film sections are heat sealed together to prevent the entry into the package of dirt and water at the overlapping edge portions.

14. The package of glass fiber insulation according to claim 10, wherein:
the first polymeric film section is a clear polymeric film section and a third banner section is located intermediate the first polymeric film section and the plurality of compressed resilient glass fiber insulation blanket layers encapsulated within the multi-section tubular covering and is held in place against an inner surface of the first polymeric film section by forces exerted on the first polymeric film section and the third inner banner section by the compressed resilient glass fiber insulation blanket layers enveloped within the multi-section tubular covering.

15. The package of glass fiber insulation according to claim 14, wherein:
the overlapping edge portions of the first and second polymeric film sections are not bonded together.

16. The package of resilient fibrous insulation according to claim 14, wherein:
the overlapping edge portions of the first and second polymeric film sections are heat sealed together to prevent the entry into the package of dirt and water at the overlapping edge portions.

17. A package of resilient glass fiber insulation, comprising:
a plurality of resilient glass fiber insulation blanket layers; the resilient glass fiber insulation blanket layers having a length, a width and a thickness; the resilient glass fiber insulation blanket layers having an uncompressed density between about 0.4 and 1.5 pounds/ft$^3$ and an uncompressed thickness of at least one inch; the resilient glass fiber insulation blanket layers being in a compressed state;
the resilient glass fiber insulation blanket layers being encapsulated within a multi-section tubular covering; the multi-section tubular covering comprising first, second and third separate overlapping polymeric film sections with each film section having information thereon relating to the compressed resilient glass fiber insulation blanket layers within the multi-section tubular covering and with at least some of the information on one of the polymeric film sections being different from the information on one of the other polymeric film sections; and the first polymeric film section having a tubular configuration and being closed at an outer end to encapsulate a first end portion of the plurality of compressed resilient glass fiber insulation layers encapsulated within the multi-section tubular covering; the second polymeric film section having a tubular configuration and being open at both ends to encapsulate a middle portion of the plurality of compressed resilient glass fiber insulation layers encapsulated within the multi-section tubular covering; the third polymeric film section having a tubular configuration and being closed at an outer end to encapsulate a second end portion of the plurality of compressed resilient glass fiber insulation layers encapsulated within the multi-section tubular covering; and forces exerted on the first, second and third separate overlapping polymeric film sections to maintain the polymeric film sections in place relative to each other.

18. The package of glass fiber insulation according to claim 17, wherein:
an edge portion of the first polymeric film section and a first edge portion of the second polymeric film section overlap and are sealed together, by forces exerted by the compressed resilient glass fiber insulation blanket layers encapsulated within the multi-section tubular covering on the first and second polymeric film sections, to at least retard the passage of dirt and water into the package; and an edge portion of the third polymeric film section and a second edge portion of the second polymeric film section overlap and are sealed together, by forces exerted by the compressed resilient glass fiber insulation blanket layers encapsulated within the multi-section tubular covering on the third and second polymeric film sections, to at least retard the passage of dirt and water into the package.

19. The package of resilient glass fiber insulation according to claim 18, wherein:
the overlapping edge portions of the first and second polymeric film sections and the overlapping edge portions of the third and second polymeric film sections are not bonded together.

20. The package of resilient glass fiber insulation according to claim 18, wherein:
the overlapping edge portions of the first and second polymeric film sections and the overlapping edge portions of the second and third film sections are heat sealed together to prevent the entry into the package of dirt and water at the overlapping edge portions.

21. The package of glass fiber insulation according to claim 18, wherein:
the compressed resilient glass fiber insulation blanket layers are compressed resilient glass fiber insulation batts.

* * * * *